United States Patent
Notte

(10) Patent No.: US 8,923,582 B2
(45) Date of Patent: Dec. 30, 2014

(54) SYSTEMS AND METHODS FOR COMPUTER AIDED DETECTION USING PIXEL INTENSITY VALUES

(75) Inventor: Christopher Jude Notte, Burlington, VT (US)

(73) Assignee: General Electric Company, Schenectady, NY (US)

( * ) Notice: Subject to any disclaimer, the term of this patent is extended or adjusted under 35 U.S.C. 154(b) by 300 days.

(21) Appl. No.: 13/485,057

(22) Filed: May 31, 2012

(65) Prior Publication Data

US 2013/0322710 A1 Dec. 5, 2013

(51) Int. Cl.
*G06K 9/00* (2006.01)

(52) U.S. Cl.
USPC .......................................................... 382/128

(58) Field of Classification Search
USPC .......... 382/128, 130, 131, 132, 218, 270, 272
See application file for complete search history.

(56) References Cited

U.S. PATENT DOCUMENTS

| | | | |
|---|---|---|---|
| 5,790,690 A * | 8/1998 | Doi et al. | 382/128 |
| 6,058,322 A * | 5/2000 | Nishikawa et al. | 600/408 |
| 7,319,781 B2 * | 1/2008 | Chen et al. | 382/128 |
| 2008/0037876 A1 * | 2/2008 | Galperin | 382/203 |
| 2008/0298657 A1 * | 12/2008 | Shiraishi et al. | 382/130 |

* cited by examiner

*Primary Examiner* — Yon Couso
(74) *Attorney, Agent, or Firm* — Hanley, Flight and Zimmerman, LLC

(57) ABSTRACT

Methods, systems, and computer-readable media are provided for computer aided detection. An example method includes determining a pixel threshold value for an analysis of an image selected by a user. The image includes a plurality of pixels. The example method includes determining a segmentation setting for the analysis. The segmentation setting specifies a size of a portion of the image to be used during the analysis. The example method includes analyzing the image by performing a comparison between a first and second segment of the image based on the pixel threshold value and the segmentation setting. The example method includes identifying potential abnormalities in the image based on the analysis.

24 Claims, 6 Drawing Sheets

SYSTEMS AND METHODS FOR COMPUTER AIDED DETECTION USING PIXEL INTENSITY VALUES

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND

Healthcare environments, such as hospitals or clinics, include information systems, such as hospital information systems (HIS), radiology information systems (RIS), clinical information systems (CIS), and cardiovascular information systems (CVIS), and storage systems, such as picture archiving and communication systems (PACS), library information systems (LIS), and electronic medical records (EMR). Information stored may include patient medical histories, imaging data, test results, diagnosis information, management information, and/or scheduling information, for example. The information may be centrally stored or divided at a plurality of locations. Healthcare practitioners may desire to access patient information or other information at various points in a healthcare workflow. For example, during and/or after surgery, medical personnel may access patient information, such as images of a patient's anatomy, which are stored in a medical information system. Radiologist and/or other clinicians may review stored images and/or other information, for example.

Using a PACS and/or other workstation, a clinician, such as a radiologist, may perform a variety of activities, such as an image reading, to facilitate a clinical workflow. A reading, such as a radiology or cardiology procedure reading, is a process of a healthcare practitioner, such as a radiologist or a cardiologist, viewing digital images of a patient. The practitioner performs a diagnosis based on a content of the diagnostic images and reports on results electronically (e.g., using dictation or otherwise) or on paper. The practitioner, such as a radiologist or cardiologist, typically uses other tools to perform diagnosis. Some examples of other tools are prior and related prior (historical) exams and their results, laboratory exams (such as blood work), allergies, pathology results, medication, alerts, document images, and other tools. For example, a radiologist or cardiologist typically looks into other systems such as laboratory information, electronic medical records, and healthcare information when reading examination results.

PACS were initially used as an information infrastructure supporting storage, distribution, and diagnostic reading of images acquired in the course of medical examinations. As PACS developed and became capable of accommodating vast volumes of information and its secure access, PACS began to expand into the information-oriented business and professional areas of diagnostic and general healthcare enterprises. For various reasons, including but not limited to a natural tendency of having one information technology (IT) department, one server room, and one data archive/backup for all departments in healthcare enterprise, as well as one desktop workstation used for all business day activities of any healthcare professional, PACS is considered as a platform for growing into a general IT solution for the majority of IT oriented services of healthcare enterprises.

Medical imaging devices now produce diagnostic images in a digital representation. The digital representation typically includes a two dimensional raster of the image equipped with a header including collateral information with respect to the image itself, patient demographics, imaging technology, and other data used for proper presentation and diagnostic interpretation of the image. Often, diagnostic images are grouped in series, each series representing images that have some commonality and differ in one or more details. For example, images representing anatomical cross-sections of a human body substantially normal to its vertical axis and differing by their position on that axis from top (head) to bottom (feet) are grouped in so-called axial series. A single medical exam, often referred as a "study" or an "exam," typically includes one or more series of images, such as images exposed before and after injection of contrast material or images with different orientation or differing by any other relevant circumstance(s) of imaging procedure. The digital images are forwarded to specialized archives equipped for safe storage, search, access, and distribution of the images and collateral information for successful diagnostic interpretation.

BRIEF SUMMARY

Methods, systems, and computer-readable media are provided for computer aided detection using pixel intensity values. An example method includes determining a pixel threshold value for an analysis of an image selected by a user. The image includes a plurality of pixels. The example method includes determining a segmentation setting for the analysis. The segmentation setting specifies a size of a portion of the image to be used during the analysis. The example method includes analyzing the image by performing a comparison between a first and second segment of the image based on the pixel threshold value and the segmentation setting. The example method includes identifying potential abnormalities in the image based on the analysis.

An example system includes a threshold controller to determine a pixel threshold value for an analysis of an image selected by a user. The image includes a plurality of pixels. The example system includes a segmentation controller to determine a segmentation setting for the analysis. The segmentation setting specifies a size of a portion of the image to be used during the analysis. The example system includes an image analyzer to analyze the image by performing a comparison between a first and second segment of the image based on the pixel threshold value and the segmentation setting and to identify potential abnormalities in the image based on the analysis.

An example tangible computer readable medium stores instructions that, when executed, cause a computing device to determine a pixel threshold value for an analysis of an image selected by a user. The image includes a plurality of pixels. The example instructions cause the computing device to determine a segmentation setting for the analysis. The segmentation setting specifies a size of a portion of the image to be used during the analysis. The example instructions cause the computing device to analyze the image by performing a comparison between a first and second segment of the image based on the pixel threshold value and the segmentation setting. The example instructions cause the computing device to identify potential abnormalities in the image based on the analysis.

Figure 1:
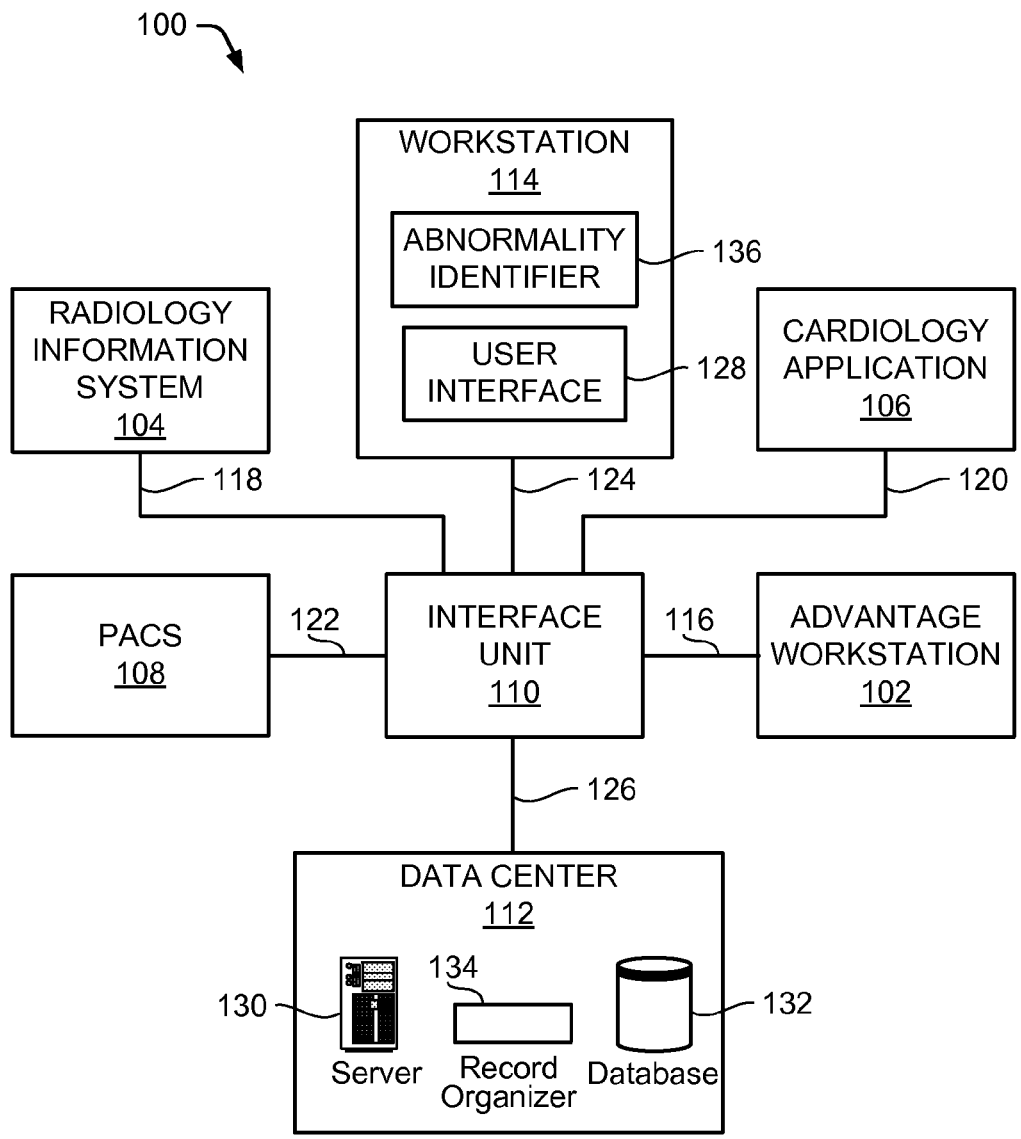
FIG. 1 illustrates a block diagram of an example clinical information system that may be used to implement systems and methods described herein.

The foregoing summary, as well as the following detailed description of certain examples of the present invention, will be better understood when read in conjunction with the appended drawings. For the purpose of illustrating the invention, certain examples are shown in the drawings. It should be understood, however, that the present invention is not limited to the arrangements and instrumentality shown in the attached drawings.

DETAILED DESCRIPTION OF CERTAIN EXAMPLES

Certain examples described herein facilitate identification of potential abnormalities in a medical image by analyzing pixel composition within the medical image. Generally, diseases (e.g., tumors) have a different pixel density within a medical image than non-diseased areas of the medical image. By analyzing pixel composition within a medical image, a healthcare practitioner (e.g., a radiologist) may be alerted to a potential abnormality (e.g., diseased or cancerous tissue) within the medical image. Such a pixel composition analysis provides identification of potential abnormalities across many image modalities (e.g., a cardiology application, a radiology application, etc.).

Disease processes, tumors, etc., appearing within a medical image have pixel values that vary from normal (e.g., non-diseased) pixel values of the medical image. Comparing pixel differential values (e.g., pixel values of one segment of an image to pixel values of another segment of the image) to threshold pixel values facilities identification of areas of the image that may contain a potential abnormality. These potential abnormalities may be highlighted within the display of the image for a user for easy recognition of such potential abnormalities. By comparing differences between pixel values within an image, a user (e.g., a radiologist) may manipulate the image (e.g., increase or decrease the brightness of the image), an analysis of the image based on pixel values may still be performed. For example, rather than comparing an absolute pixel value of an image to a threshold, a difference between pixel values of two areas of the image are compared to a threshold.

The image analysis may be performed on an image when the user opens the image for review or when the image is captured. Once potential abnormalities have been identified, the image is displayed with such potential abnormalities highlighted within the image. The potential abnormality (e.g., cancerous tissue) may also be displayed within the image. The identification of the potential abnormality may facilitate additional user action. For example, the user may select the highlighted portion of the image to increase the size of the area of the image containing the potential abnormality. In some examples, the user may select the potential abnormality and additional information about the abnormality may be displayed or an order may be accessed to facilitate additional testing related to the potential abnormality.

FIG. 1 illustrates a block diagram of an example clinical information system 100 capable of implementing the example methods and systems described herein. The example clinical information system 100 includes a clinical application or advantage workstation ("AW") 102, a radiology information system ("RIS") 104, a cardiology application 106, a picture archiving and communication system ("PACS") 108, an interface unit 110, a data center 112, and a workstation 114. In the illustrated example, the AW 102, the RIS 104, the cardiology application 106, and the PACS 108 are housed in a healthcare facility and locally archived. However, in other implementations, the AW 102, the RIS 104, the cardiology application 106, and/or the PACS 108 may be housed in one or more other suitable locations. In certain implementations, one or more of the PACS 108, cardiology application 106, RIS 104, AW 102, etc., can be implemented remotely via a thin client and/or downloadable software solution. Furthermore, one or more components of the clinical information system 100 may be combined and/or implemented together. For example, the RIS 104, the cardiology application 106, and/or the PACS 108 may be integrated with the AW 102; the PACS 108 may be integrated with the RIS 104 and/or the cardiology application 106; and/or the four example information systems 102, 104, 106, and/or 108 may be integrated together. In other example implementations, the clinical information system 100 includes a subset of the illustrated information systems 102, 104, 106, and/or 108. For example, the clinical information system 100 may include only one, two, or three of the AW 102, the RIS 104, the cardiology application 106, and/or the PACS 108. Preferably, information (e.g., image data, image analysis, processing, scheduling, test results, observations, diagnosis, etc.) is entered into the AW 102, the RIS 104, the cardiology application 106, and/or the PACS 108 by healthcare practitioners (e.g., radiologists, physicians, and/or technicians) before and/or after patient examination.

The AW 102 provides post-processing and synergized imaging techniques, across CT, MRI, PET, SPECT, Interventional, etc. The AW 102 can provide 2D, 3D, and/or 4D post-processing workstations as well as facilitate remote review and sharing of images in real time. The RIS 104 stores information such as, for example, radiology reports, messages, warnings, alerts, patient scheduling information, patient demographic data, patient tracking information, and/or physician and patient status monitors. Additionally, the RIS 104 enables exam order entry (e.g., ordering an x-ray of a patient) and image and film tracking (e.g., tracking identities of one or more people that have checked out a film). In some examples, information in the RIS 104 is formatted according to the HL-7 (Health Level Seven) clinical communication protocol. The cardiology application 106 stores information such as, for example, cardiology reports, messages, warnings, alerts, patient scheduling information, patient demographic data, patient tracking information, and/ or physician and patient status monitors. The cardiology application 106 provides exam order entry and image and film tracking related to cardiology.

The PACS 108 stores medical images (e.g., x-rays, scans, three-dimensional renderings, etc.) as, for example, digital images in a database or registry. In some examples, the medical images are stored in the PACS 108 using the Digital Imaging and Communications in Medicine ("DICOM") format. Images are stored in the PACS 108 by healthcare practitioners (e.g., imaging technicians, physicians, radiologists) after a medical imaging of a patient and/or are automatically transmitted from medical imaging devices to the PACS 108 for storage. In some examples, the PACS 108 may also include a display device and/or viewing workstation to enable a healthcare practitioner to communicate with the PACS 108.

The interface unit 110 includes a hospital information system interface connection 116, a radiology information system interface connection 118, a cardiology application interface connection 120, a PACS interface connection 122, a workstation interface connection 124, and a data center interface connection 126. The interface unit 110 facilities communication among the AW 102, the RIS 104, the cardiology application, 106, the PACS 108, the data center 112, and/or the workstation 114. The interface connections 116, 118, 120, 122, 124, and/or 126 may be implemented by, for example, a Wide Area Network ("WAN") such as a private network or the Internet. Accordingly, the interface unit 110 includes one or more communication components such as, for example, an Ethernet device, an asynchronous transfer mode ("ATM") device, an 802.11 device, a DSL modem, a cable modem, a cellular modem, etc.

In operation, the interface unit 110 receives images, medical reports, administrative information, and/or other clinical information from the information systems 102, 104, 106, 108 via the interface connections 116, 118, 120, 122. If necessary (e.g., when different formats of the received information are incompatible), the interface unit 110 translates or reformats (e.g., into Structured Query Language ("SQL") or standard text) the medical information, such as medical reports, to be properly stored at the data center 112. Preferably, the reformatted medical information may be transmitted using a transmission protocol to enable different medical information to share common identification elements, such as a patient name or social security number. Next, the interface unit 110 transmits the medical information to the data center 112 via the data center interface connection 126. Finally, medical information is stored in the data center 112 in, for example, the DICOM format, which enables medical images and corresponding medical information to be transmitted and stored together.

The medical information is later viewable and easily retrievable at the workstation 114 (e.g., by their common identification element, such as a patient name or record number). The workstation 114 may be any equipment (e.g., a personal computer) capable of executing software that permits electronic data (e.g., medical reports) and/or electronic medical images (e.g., x-rays, ultrasounds, MRI scans, etc.) to be acquired, stored, or transmitted for viewing and operation. The workstation 114 receives commands and/or other input from a user via, for example, a keyboard, mouse, track ball, microphone, etc. The workstation 114 is capable of implementing a user interface 128 to enable a healthcare practitioner to interact with the clinical information system 100. For example, in response to a request from a physician, the user interface 128 presents a patient medical history.

As shown in FIG. 1, the workstation 114 is located with the systems 102, 104, 106, and 108. In other examples, a workstation may communicate with any of the systems 102, 104, 106, and 108 and/or the interface unit 110 or the data center 112 via a network. Thus, any of the systems 102, 104, 106, 108, 110, 112, and 114 may be implemented at a plurality of locations (e.g., a hospital, clinic, doctor's office, other medical office, or terminal, etc.). The network may be implemented by, for example, the Internet, an intranet, a private network, a wired or wireless Local Area Network, and/or a wired or wireless Wide Area Network.

The example data center 112 of FIG. 1 is an archive to store information such as, for example, images, data, medical reports, and/or, more generally, patient medical records. In addition, the data center 112 may also serve as a central conduit to information located at other sources such as, for example, local archives, hospital information systems, radiology information systems, applications (e.g., the RIS 104 and/or the cardiology application 106), or medical imaging/storage systems (e.g., the PACS 108 and/or connected imaging modalities). That is, the data center 112 may store links or indicators (e.g., identification numbers, patient names, or record numbers) to information. In the illustrated example, the data center 112 is managed by an application server provider ("ASP") and is located in a centralized location that may be accessed by a plurality of systems and facilities (e.g., hospitals, clinics, doctor's offices, other medical offices, and/or terminals). In some examples, the data center 112 may be spatially distant from the AW 102, the RIS 104, the cardiology application 106, and/or the PACS 108 (e.g., at General Electric® headquarters). In certain examples, the AW 102 can be integrated with one or more of the PACS 108, cardiology application 106, RIS 104, etc., via a messaging framework and viewer.

The example data center 112 of FIG. 1 includes a server 130, a database 132, and a record organizer 134. The server 130 receives, processes, and conveys information to and from the components of the clinical information system 100. The database 132 stores the medical information described herein and provides access thereto. The example record organizer 134 of FIG. 1 manages patient medical histories, for example. The record organizer 134 can also assist in procedure scheduling, for example.

The workstation 114 of the illustrated example includes an abnormality identifier 136 to analyze medical image and identify any potential abnormalities (e.g., cancerous tissue, lesions, tumors, etc.) within the image. The example abnormality identifier 136 analyzes medical images across various modalities (e.g., the cardiology application 106 and/or the RIS 104) to identify potential abnormalities. Often times, various disease processes, tumors, etc. within a medical image have pixel values that vary from normal (e.g., non-diseased) pixel values of the medical image. Comparing pixel differential values (e.g., pixel values of one segment of an image to pixel values of another segment of the image) to threshold pixel values facilities identification of areas of the image that may contain a potential abnormality. These potential abnormalities may be highlighted within the display of the image for a user for easy recognition of such potential abnormalities. By comparing differences between pixel values within an image, a user (e.g., a radiologist) may manipulate the image (e.g., increase or decrease the brightness of the image), an analysis of the image based on pixel values may still be performed. For example, rather than comparing an absolute pixel value of an image to a threshold, a difference between pixel values of two areas of the image are compared to a threshold. The image analysis may be performed on an image when the user opens the image for review on the workstation 114. Once potential abnormalities have been identified, the image is displayed via the user interface 128 with such potential abnormalities highlighted within the image. The potential abnormality (e.g., cancerous tissue) may also be displayed within the image. While the abnormality identifier 136 of FIG. 1 is located in the workstation 114, the abnormality identifier 136 may be located in any of the systems 102, 104, 106, 108, 110, and/or 112.

Figure 2:
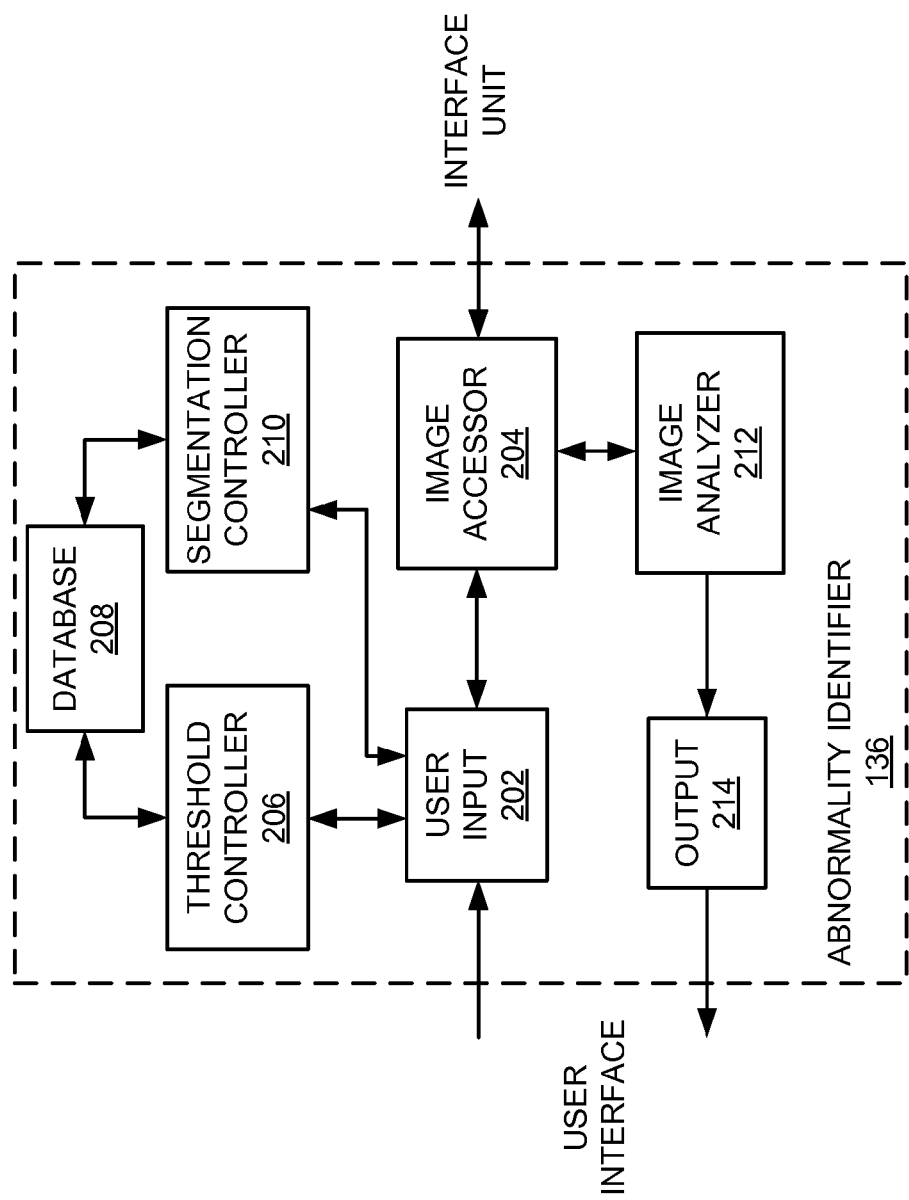
FIG. 2 illustrates a block diagram of an example abnormality identifier of FIG. 1.

FIG. 2 illustrates a block diagram of an example abnormality identifier 136 of FIG. 1. The example abnormality identifier 136 is used to analyze medical images across various modalities (e.g., a cardiology application, a radiology application, etc.) to identify potential abnormalities (e.g., tumors, lesions, etc.) within the medical images. The medical images along with any identified potential abnormalities are displayed for a user at a workstation (e.g., the workstation 114 of FIG. 1) via a user interface (e.g., the user interface 128 of FIG. 1). Medical images (e.g., digital images) are made up pixels. Each pixel in an image has a pixel value that describes how bright the pixel is. These pixel values may be analyzed to identify potential abnormalities in the medical images. For example, in a particular medical image, a healthcare practitioner (e.g., a radiologist) may expect to see a certain pixel value in a first area of the image and another pixel value in a second area of the image. If, for example, the pixel value in the first area is substantially larger than expected when compared to the pixel value in the second area, the radiologist may be informed that a potential abnormality exists in the first area of the image. The abnormality identifier 136 of the illustrated example facilitates such an image analysis and provides a user with control over the analysis. The abnormality identifier 136 of the illustrated example includes a user input 202, an image accessor 204, a threshold controller 206, a database 208, a segmentation controller 210, an image analyzer 212, and an output 214.

The user input 202 of the illustrated example allows a user to control the analysis of medical images. The user input 202 receives various forms of user input via, for example, the user interface 128. The user input 202 receives, for example, a selection of a medical image for viewing at the workstation 114. Once the user input 202 has received the selection of a medical image for viewing, the image accessor 204 of the illustrated example accesses the medical image via an interface unit (e.g., the interface unit 110 of FIG. 1). The interface unit 110 facilitates access to a variety of types of medical images from various imaging modalities (e.g., the RIS 104 or the cardiology application 106).

The user input 202 of the illustrated example also receives user input related to pixel differential thresholds to be used when conducting analysis of the selected medical image. The thresholds received from the user via the user input 202 identify expected pixel value differentials between two areas of a medical image. The thresholds may vary based on a type of medical image being viewed, an area of a medical image being analyzed, a type of abnormality the image is being reviewed for, etc. The user input 202 facilitates user control over the image analysis by allowing a user to specify what threshold values to use when analyzing pixel values within the image. Input from the user related to the thresholds is sent from the user input 202 to the threshold controller 206.

The threshold controller 206 of the illustrated example controls the thresholds used in the image analysis. The threshold controller 206 may store thresholds input via the user input 202 in the database 208. The threshold controller 206 stores thresholds in the database 208 based on image type, area of a medical image being analyzed, a type of abnormality an image is being reviewed for, etc. The thresholds may be entered and/or adjusted by a user and/or the threshold controller 206 may provide automatic thresholds for image analysis using the thresholds stored in the database 208. For example, a user may choose not to enter any threshold value and an analysis is performed on an image using thresholds selected by the threshold controller 206 based on the image type (e.g., an x-ray of a wrist).

The user input 202 of the illustrated example also receives input from a user to control segmentation of the medical image during analysis. An analysis of pixel values within a medical image may be performed in a variety of ways. For example, each pixel value in an image may be compared to a neighboring pixel value. Additionally or alternatively, an average of pixel values of a group of pixels may be computed and then compared to a neighboring group of pixels. This varying analysis allows an image to be analyzed in a more fine-grained or broad manner depending upon the medical image, the area of the image being analyzed, the potential abnormality to be detected, etc. For example, a user may select a fine-grained analysis and specify that an analysis is to be performed on a pixel by pixel basis. In another example, a user may select a broader analysis in which the image is divided into 500 segments where average pixel values are computed for each segment and compared.

The segmentation controller 210 of the illustrated example controls segmentation of images for analysis. The segmentation controller 210 may store segmentation controls input via the user input 202 in the database 208. The segmentation controller 210 stores segmentation controls in the database 208 based on image type, area of a medical image being analyzed, a type of abnormality an image is being reviewed for, etc. The thresholds may be entered and/or adjusted by a user and/or the segmentation controller 2106 may provide automatic segmentation controls for image analysis using the segmentation controls stored in the database 208. For example, a user may choose not to enter any segmentation control and an analysis is performed on an image using a segmentation control selected by the segmentation controller 210 based on the image type (e.g., an x-ray of a wrist).

Normal threshold values and/or segmentation controls to be used during image analysis to reflect normal (e.g., non-abnormal, healthy) images are stored in the database 208 and/or entered by a user. For example, a variety of tests may be conducted by a user to collect and/or determine such normal values. The normal values may be based on image type, area of an image, type of abnormality to identify during analysis, etc. Once threshold values and segmentation controls have been selected (e.g., by a user or automatically), the image analyzer 212 of the illustrated example analyzes the image based on those threshold values and segmentation controls. The image analysis process is described in greater detail below in connection with FIG. 3 and FIG. 5. Once the image analyzer 212 analyzes the selected image, the image is displayed along with any identified potential abnormalities by the output 214. The output 214 may display the image via the user interface 128. The output 214 may display any identified potential abnormalities by highlighting (e.g., circling) the area of the image in which the potential abnormality is identified. In some examples, the potential abnormality is displayed on the image in, for example, a text box. For example, if the image analyzer 212 identifies potentially cancerous tissue within a medical image, the image may be displayed by the output 214 with an identifier of "cancerous tissue" on and/or near the portion of the image containing the potential abnormality. Such a display facilitates further review of the potential abnormality by a user. For example, selecting the potential abnormality may provide a larger view of that area of the image, may provide additional information related to the potential abnormality, may provide an order for additional testing to be performed based on the potential abnormality, etc.

Figure 3:
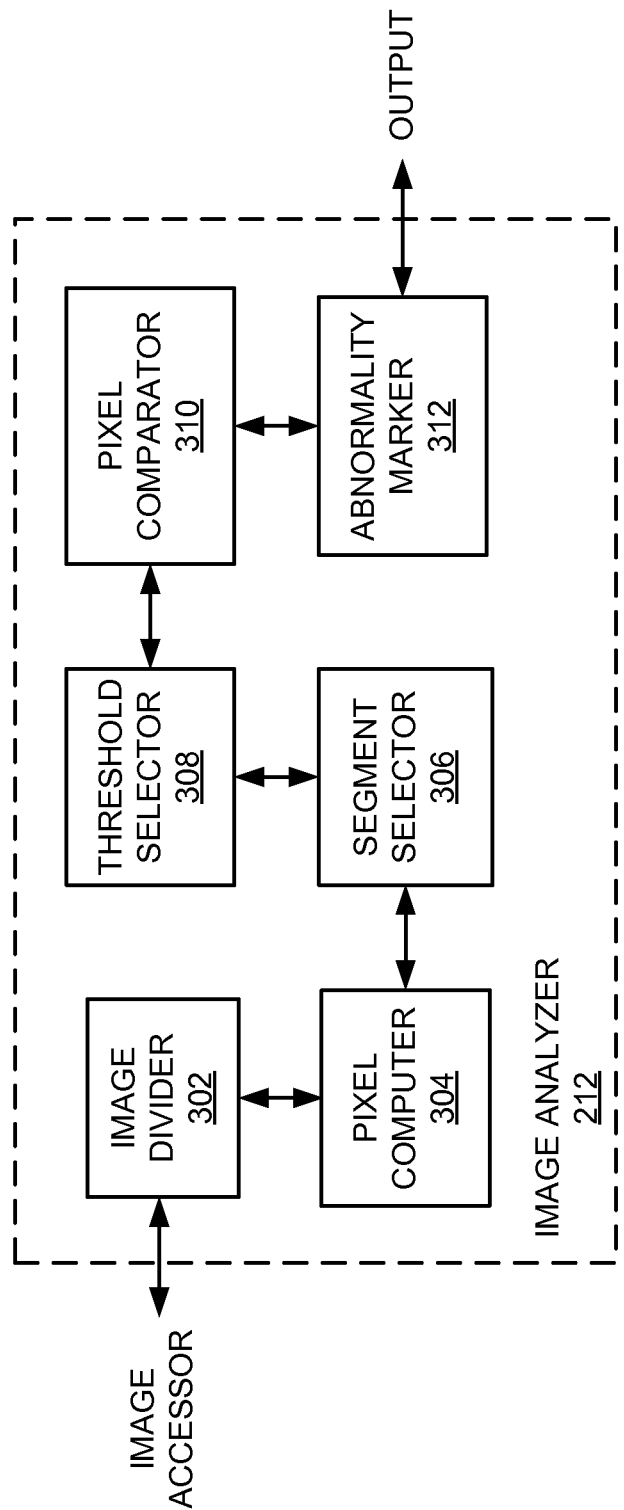
FIG. 3 illustrates a block diagram of an example image analyzer of FIG. 2.

FIG. 3 illustrates a block diagram of an example image analyzer 212 of FIG. 2. The image analyzer 212 of the illustrated example analyzes selected medical images for potential abnormalities within the medical images based on pixel differential thresholds and segmentation controls. As described above in connection with FIG. 2, a user may select a medical image for display at a workstation (e.g., the workstation 114 of FIG. 1). Pixel differential threshold values may be selected by a user and/or selected automatically based on image type, area of an image to be analyzed, a potential abnormality to perform an analysis for, etc. The pixel differential threshold value specifies an expected differential between pixel values of neighboring areas of a medical image. The expected threshold values correspond to normal image values (e.g., values reflecting an absence of potential abnormalities within an image). Segmentation controls may be selected by a user and/or selected automatically based on image type, area of an image to be analyzed, a potential abnormality to perform an analysis, etc. Segmentation controls specify a manner in which the selected image is to be analyzed. For example, an image may be analyzed on a pixel by pixel basis or may be divided into larger areas where average pixel values for those areas are compared. Segmentation controls allow an image analysis to be performed in a fine-grained manner or on a broader scale. The image analyzer 212 of the illustrated example includes an image divider 302, a pixel computer 304, a segment selector 306, a threshold selector 308, a pixel comparator 310, and an abnormality marker 312.

The image divider 302 of the illustrated example performs segmentation of the selected medical image based on the segmentation controls selected by a user and/or selected automatically by the segmentation controller 210 of FIG. 2. For example, if the image is to be analyzed on a pixel by pixel basis, the image divider 302 divides the image by pixel. If the image is to be analyzed on a larger scale (for example, groups of hundreds or thousands of pixels), the image divider 302 divides the image according to that larger scale. For example, the image divider 302 may divide the image into one thousand sections based on a user input. The pixel computer 304 of the illustrated example computes pixel values for each section of the image. For example, if the image is being analyzed pixel by pixel, the average for each pixel is the pixel value for that pixel. If the image is divided into one thousand sections, the pixel computer 304 calculates the average pixel value for all pixels contained within each section of one thousand sections.

The segment selector 306 of the illustrated example selects segments of the image for analysis. The segment selector 306 selects a first segment and a second segment that is located near the first segment (e.g., next to the first segment) for analysis. Once a pixel analysis has been performed on the first and second segment, the segment selector 306 selects new first and second segments such that an iterative analysis is performed on all segments of the image to be analyzed.

The threshold selector 308 of the illustrated example selects a pixel differential threshold value to be used during the pixel comparison of the segments selected by the segment selector 306. The threshold controller 206 of FIG. 2 selects the appropriate thresholds to be used during the analysis of the image (e.g., three different values may be selected to examine three types of potential abnormalities). The threshold selector 308 selects each of these threshold values to be used in the pixel comparison. Thus, the threshold selector 308 allows a variety of analysis to be performed on a single image. For example, a first threshold value may reflect a first potential abnormality and a second threshold value may reflect a second potential abnormality. The threshold selector 308 allows an analysis to be performed based on both the first and second threshold values.

The pixel comparator 310 of the illustrated example compares the pixel values for the segments of the image to the threshold values selected by the threshold selector 308. The pixel comparator 310 compares the difference between a pixel value (or average pixel value) of a first segment to a pixel value (or average pixel value) of a second segment and determines if the difference exceeds the appropriate threshold value. If the difference between the pixel values exceeds the threshold, the abnormality marker 312 of the illustrated example identifies the potential abnormality and marks the first and/or second segment of the image with the potential abnormality. The potential abnormality is then indicated when the image is displayed via an output (e.g., the output 214 of FIG. 2 and/or the user interface 128 of FIG. 1). The pixel comparator 310 steps through each segment of the image and compares the pixel values to identify any potential abnormalities.

While the example abnormality identifier 136 and the example image analyzer 212 have been illustrated in FIGS. 2 and 3, one or more of the elements, processes and/or devices illustrated in FIGS. 2 and/or 3 may be combined, divided, re-arranged, omitted, eliminated and/or implemented in any other way. Further, the example user input 202, the image accessor 204, the threshold controller 206, the database 208, the segmentation controller 210, the output 214, the image divider 302, the pixel computer 304, the segment selector 306, the threshold selector 308, the pixel comparator 310, the abnormality marker 312, and/or, more generally, the example abnormality identifier 136 of FIG. 2 and/or the example image analyzer 212 of FIG. 3 may be implemented by hardware, software, firmware and/or any combination of hardware, software and/or firmware. Thus, for example, any of the example user input 202, the image accessor 204, the threshold controller 206, the database 208, the segmentation controller 210, the output 214, the image divider 302, the pixel computer 304, the segment selector 306, the threshold selector 308, the pixel comparator 310, the abnormality marker 312, and/or, more generally, the example abnormality identifier 136 of FIG. 2 and/or the example image analyzer 212 of FIG. 3 could be implemented by one or more circuit(s), programmable processor(s), application specific integrated circuit(s) ("ASIC(s)"), programmable logic device(s) ("PLD(s)") and/or field programmable logic device(s) ("FPLD(s)"), etc. When any of the apparatus or system claims of this patent are read to cover a purely software and/or firmware implementation, at least one of the example user input 202, the image accessor 204, the threshold controller 206, the database 208, the segmentation controller 210, the image analyzer 212, the output 214, the image divider 302, the pixel computer 304, the segment selector 306, the threshold selector 308, the pixel comparator 310, and/or the abnormality marker 312 are hereby expressly defined to include a tangible computer readable medium, such as a memory, Blu-ray, digital versatile disk ("DVD"), compact disc ("CD"), etc., storing the software and/or firmware. Further still, the example abnormality identifier 136 of FIG. 2 and/or the example image analyzer 212 of FIG. 3 may include one or more elements, processes and/or devices in addition to, or instead of, those illustrated in FIGS. 2 and/or 3, and/or may include more than one of any or all of the illustrated elements, processes and devices.

Figure 4:
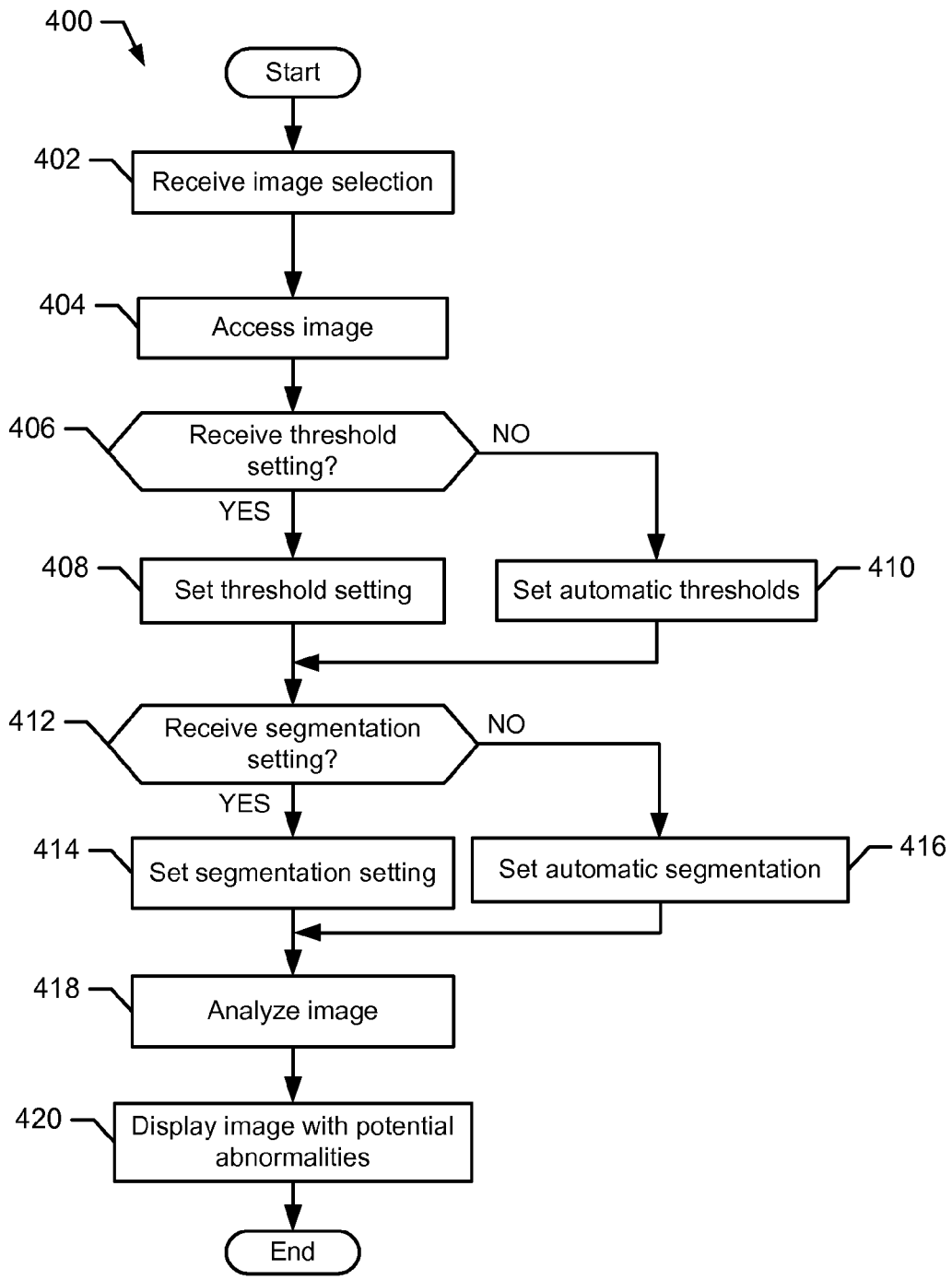
FIG. 4 illustrates a flow diagram of an example method of using the abnormality identifier of FIG. 2.
Figure 5:
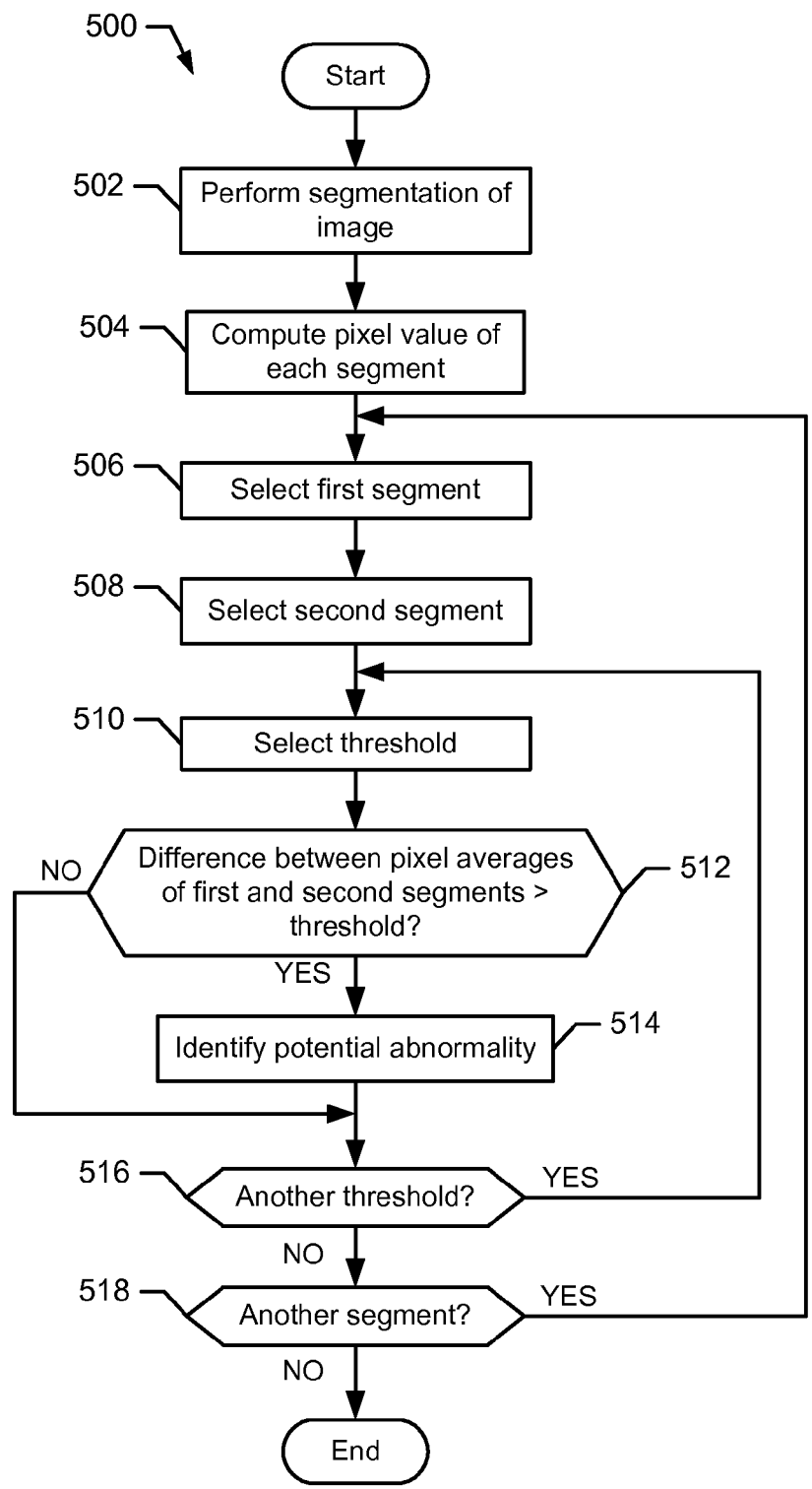
FIG. 5 illustrates a flow diagram of an example method of using the image analyzer of FIG. 3.

Flowcharts representative of example machine readable instructions for implementing the example abnormality identifier 136 of FIG. 2 and the example image analyzer 212 of FIG. 3 are shown in FIGS. 4 and 5. In these examples, the machine readable instructions comprise a program for execution by a processor such as the processor 612 shown in the example processor platform 600 discussed below in connection with FIG. 6. The program may be embodied in software stored on a tangible computer readable medium such as a compact disc read-only memory ("CD-ROM"), a floppy disk, a hard drive, a digital video disc (DVD), Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4 and 5, many other methods of implementing the example abnormality identifier 136 and/or the example image analyzer 212 may alternatively be used. For example, the order of execution of the blocks may be changed, and/or some of the blocks described may be changed, eliminated, or combined.

As mentioned above, the example processes of FIGS. 4 and 5 may be implemented using coded instructions (e.g., computer readable instructions) stored on a tangible computer readable medium such as a hard disk drive, a flash memory, a read-only memory ("ROM"), a CD, a DVD, a Blu-Ray, a cache, a random-access memory ("RAM") and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 4 and 5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

FIG. 4 illustrates a flow diagram of an example method 400 of using the abnormality identifier 136 of FIG. 2. The example abnormality identifier 136 is used to analyze medical images across various modalities (e.g., a cardiology application, a radiology application, etc.) to identify potential abnormalities (e.g., tumors, lesions, etc.) within the medical images. Initially, the user input 202 receives a selection of a medical image for viewing at a workstation (e.g., the workstation 114) (block 402). Once the user input 202 has received the selection of a medical image for viewing, the image accessor 204 accesses the medical image via an interface unit (e.g., the interface unit 110 of FIG. 1) (block 404). The interface unit 110 facilitates access to a variety of types of medical images from various imaging modalities (e.g., the RIS 104 or the cardiology application 106).

The threshold controller 206 determines if a threshold setting input has been received by the user input 202 (block 406). A threshold setting input reflects pixel differential thresholds to be used when conducting analysis of the selected medical image. The thresholds identify expected pixel value differentials between two areas of a medical image. The thresholds may vary based on a type of medical image being viewed, an area of a medical image being analyzed, a type of abnormality the image is being reviewed for, etc. If a user specifies the threshold values to be used when analyzing pixel values within the image, the threshold controller 206 sets the threshold values for analysis accordingly (e.g., stores the threshold values in the database 208) (block 408).

If the threshold controller 206 determines that no user input has been received for the threshold settings to be used during image analysis, the threshold controller sets automatic or default thresholds for the analysis (block 410). The threshold controller 206 accesses threshold values stored in the database 208 and selects appropriate threshold values based on image type, area of a medical image being analyzed, a type of abnormality an image is being reviewed for, etc. For example, a user may choose not to enter any threshold value and an analysis is performed on the image using thresholds selected by the threshold controller 206 based on the image type (e.g., an x-ray of a wrist).

The segmentation controller 210 determines if a segmentation control setting has been received via the user input 202 (block 412) to control segmentation of the medical image during analysis. The segmentation control settings specify whether a more fine-grained analysis is to be performed (e.g., a pixel by pixel analysis) or whether a broader analysis is to be performed (e.g., groups of pixels are analyzed). If a segmentation control setting has been received, the segmentation controller 210 sets the segmentation setting for analysis (e.g., stores the segmentation control setting) (block 414). If no segmentation control setting is received, the segmentation controller 210 sets an automatic segmentation control (block 416) based on image type, area of a medical image being analyzed, a type of abnormality an image is being reviewed for, etc. using segmentation control settings stored in the database 208. For example, a user may choose not to enter any segmentation control and an analysis is performed on an image using a segmentation control selected by the segmentation controller 210 based on the image type (e.g., an x-ray of a wrist).

Once threshold values and segmentation controls have been selected (e.g., by a user or automatically), the image analyzer 212 analyzes the image based on those threshold values and segmentation controls (block 418). The image analysis process is described in greater detail below in connection with FIG. 5. Once the image analyzer 212 analyzes the selected image, the image is displayed along with any identified potential abnormalities by the output 214 (block 420). The output 214 may display the image via the user interface 128. The output 214 may display any identified potential abnormalities by highlighting (e.g., circling) the area of the image in which the potential abnormality is identified. In some examples, the potential abnormality is displayed on the image in, for example, a text box. For example, if the image analyzer 212 identifies potentially cancerous tissue within a medical image, the image may be displayed by the output 214 with an identifier of "cancerous tissue" on and/or near the portion of the image containing the potential abnormality. The method 400 then ends.

FIG. 5 illustrates a flow diagram of an example method 500 of using the image analyzer 212 of FIG. 3. The image analyzer 212 analyzes selected medical images for potential abnormalities within the medical images based on pixel differential thresholds and segmentation controls. As described above in connection with FIG. 4, a user may select a medical image for display at a workstation (e.g., the workstation 114 of FIG. 1). Pixel differential threshold values may be selected by a user and/or selected automatically based on image type, area of an image to be analyzed, a potential abnormality to perform an analysis for, etc. and specify an expected differential between pixel values of neighboring areas of a medical image. Segmentation controls may be selected by a user and/or selected automatically based on image type, area of an image to be analyzed, a potential abnormality to perform an analysis, etc. and specify a manner in which the selected image is to be analyzed (e.g., fine-grained or on a broader scale).

Initially, the image divider 302 performs segmentation of the selected medical image based on the segmentation controls selected by a user and/or selected automatically by the segmentation controller 210 of FIG. 2 (block 502). For example, if the image is to be analyzed on a pixel by pixel basis, the image divider 302 divides the image by pixel. If the image is to be analyzed on a larger scale (for example, groups of hundreds or thousands of pixels), the image divider 302 divides the image according to that larger scale. The pixel computer 304 computes pixel values for each section of the image (block 504). For example, if the image is being analyzed pixel by pixel, the average for each pixel is the pixel value for that pixel. If the image is divided into one thousand sections, the pixel computer 304 calculates the average pixel value for all pixels contained within each section of one thousand sections.

The segment selector 306 selects a first segment of the image (block 506) and selects a second segment that is located near the first segment (e.g., next to the first segment) (block 508) for analysis. The threshold selector 308 selects a pixel differential threshold value to be used during the pixel comparison of the segments selected by the segment selector 306 (block 510). The threshold controller 206 of FIG. 2 selects the appropriate thresholds to be used during the analysis of the image (e.g., three different values may be selected to examine three types of potential abnormalities). The threshold selector 308 selects each of these threshold values to be used in the pixel comparison. Thus, the threshold selector 308 allows a variety of analysis to be performed on a single image.

The pixel comparator 310 compares the pixel values for the first and second segments of the image to the threshold values selected by the threshold selector 308 (block 512). The pixel comparator 310 compares the difference between the pixel value (or average pixel value) of the first segment to the pixel value (or average pixel value) of the second segment and determines if the difference exceeds the appropriate threshold value. If the difference between the pixel values exceeds the threshold, the abnormality marker 312 identifies the potential abnormality and marks the first and/or second segment of the image with the potential abnormality (block 514). If the difference between the pixel values does not exceed the threshold, control continues to block 516. The threshold selector 308 determines if there is another threshold to be used during the image analysis (block 516). If there is another threshold to be used during the image analysis, control returns to block 510 and the new threshold is selected and analysis of the image segments is performed. If there is not another threshold to be used during the image analysis, control proceeds to block 518. The segment selector 306 determines if there is another segment of the image to be analyzed (block 518). If there is another segment of the image to be analyzed, control returns to block 506 and new segments are selected for analysis. If there is not another segment of the image to be analyzed, the process 500 ends. The process 500 allows the image analyzer 212 to step through each segment of the image and compare pixel values to identify any potential abnormalities contained in the image.

Figure 6:
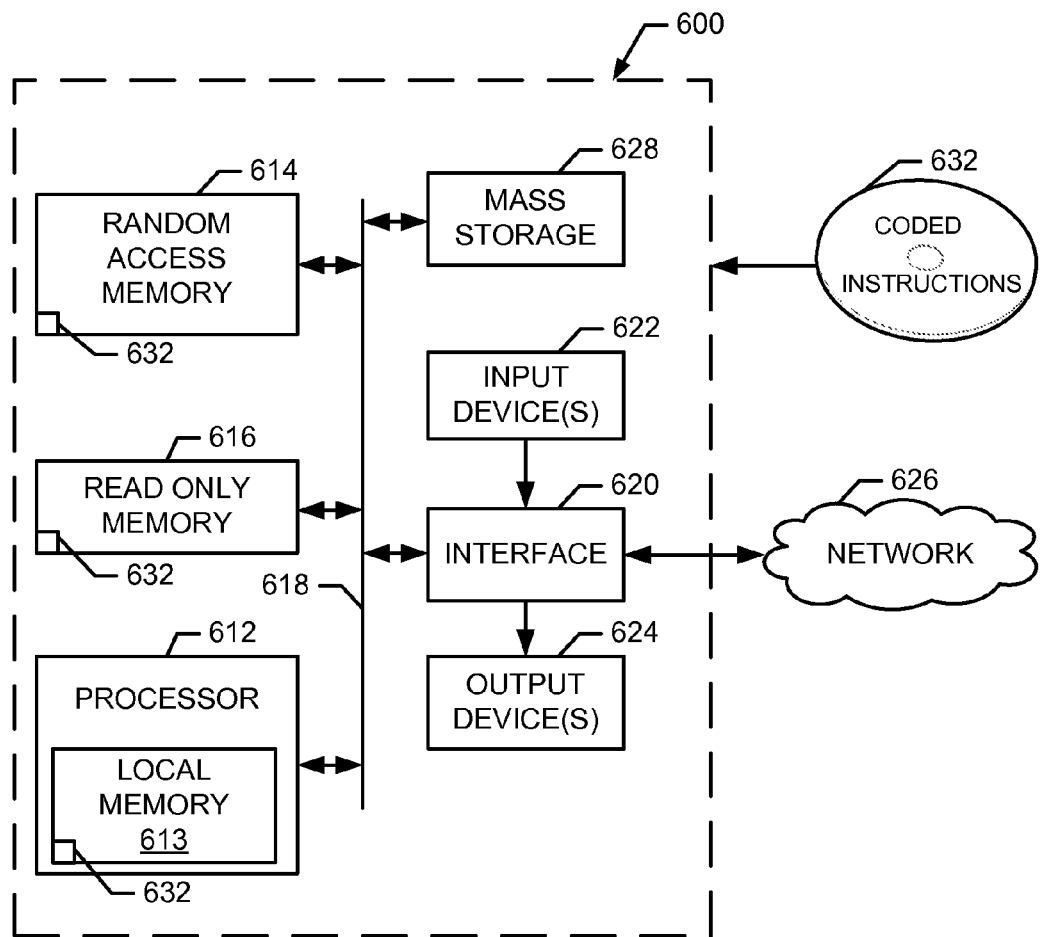
FIG. 6 is a block diagram of an example processor platform that may be used to execute the instructions of FIGS. 4 and 5 to implement the example abnormality identifier of FIG. 2, the example image analyzer of FIGS. 3, and/or, more generally, the example clinical information system of FIG. 1.

FIG. 6 is a block diagram of an example processor platform 600 capable of executing the instructions of FIGS. 4 and/or 5 to implement the example abnormality identifier 136, the example image analyzer 212 of FIGS. 3, and/or, more generally, the example system 100 of FIG. 1. The processor platform 600 can be, for example, a server, a personal computer, an Internet appliance, a set top box, or any other type of computing device.

The processor platform 600 of the instant example includes a processor 612. For example, the processor 612 can be implemented by one or more microprocessors or controllers from any desired family or manufacturer. The processor 612 includes a local memory 613 (e.g., a cache) and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device(s) can be implemented by, for example, a keyboard, a mouse, a touchscreen, a track-pad, a trackball, isopoint and/or a voice recognition system.

One or more output devices 624 are also connected to the interface circuit 620. The output devices 624 can be implemented, for example, by display devices (e.g., a liquid crystal display, a cathode ray tube display (CRT), etc.). The interface circuit 620, thus, typically includes a graphics driver card.

The interface circuit 620 also includes a communication device such as a modem or network interface card to facilitate exchange of data with external computers via a network 626 (e.g., an Ethernet connection, a digital subscriber line (DSL), a telephone line, coaxial cable, a cellular telephone system, etc.).

The processor platform 600 also includes one or more mass storage devices 628 for storing software and data. Examples of such mass storage devices 628 include floppy disk drives, hard drive disks, compact disk drives and digital versatile disk (DVD) drives. The mass storage device 1528 may implement a local storage device.

The coded instructions 632 of FIGS. 4 and/or 5 may be stored in the mass storage device 628, in the volatile memory 614, in the non-volatile memory 616, and/or on a removable storage medium such as a CD or DVD.

Although certain example methods, systems, apparatus, and articles of manufacture have been described herein, the scope of coverage of this patent is not limited thereto. On the contrary, this patent covers all methods, systems and articles of manufacture fairly falling within the scope of the claims of this patent.

What is claimed is:

1. A method for computer aided detection, the method comprising:
   determining a pixel threshold value for an analysis of an image selected by a user, wherein the image includes a plurality of pixels;
   determining a segmentation setting for the analysis, the segmentation setting specifying a size of a portion of the image to be used during the analysis;
   analyzing, using a computer, the image by determining a difference between a first segment of the image and a second segment of the image and comparing the difference to the pixel threshold value and the segmentation setting; and
   identifying, using a computer, potential abnormalities in the image based on the analysis.

2. The method of claim 1, wherein the pixel threshold value defines a pixel value of a normal image, the pixel value representing a brightness of the image.

3. The method of claim 1, wherein analyzing the image comprises:
   selecting the first segment of the image based on the segmentation setting;
   selecting the second segment of the image based on the segmentation setting;
   computing a first average pixel value for the first segment;
   computing a second average pixel value for the second segment;
   determining a difference between the first average pixel value and the second average pixel value; and
   comparing the difference between the first average pixel value and the second average pixel value to the pixel threshold value.

4. The method of claim 3, wherein a potential abnormality is identified when the difference between the first average pixel value and the second average pixel value exceeds the pixel threshold value.

5. The method of claim 1, wherein the pixel threshold value is at least one of selected by a user or selected automatically.

6. The method of claim 1, wherein the segmentation setting is at least one of selected by a user or selected automatically.

7. The method of claim 1, further comprising outputting the identified potential abnormalities.

8. The method of claim 7, wherein outputting the identified potential abnormalities includes at least one of displaying the image with the identified potential abnormalities via a user interface, sending the identified potential abnormalities to a device associated with a healthcare system, or generating an alert related to the identified potential abnormalities.

9. A system for computer aided detection, the system comprising:
   a threshold controller to determine a pixel threshold value for an analysis of an image selected by a user, wherein the image includes a plurality of pixels;
   a segmentation controller to determine a segmentation setting for the analysis, the segmentation setting specifying a size of a portion of the image to be used during the analysis; and
   an image analyzer to analyze the image by determining a difference between a first segment of the image and a second segment of the image and comparing the difference to the pixel threshold value and the segmentation setting and to identify potential abnormalities in the image based on the analysis.

10. The system of claim 9, wherein the pixel threshold value defines a pixel value of a normal image, the pixel value representing a brightness of the image.

11. The system of claim 9, wherein the image analyzer is to:
   select the first segment of the image based on the segmentation setting;
   select the second segment of the image based on the segmentation setting;
   compute a first average pixel value for the first segment;
   compute a second average pixel value for the second segment;
   determine a difference between the first average pixel value and the second average pixel value; and
   compare the difference between the first average pixel value and the second average pixel value to the pixel threshold value.

12. The system of claim 11, wherein a potential abnormality is identified when the difference between the first average pixel value and the second average pixel value exceeds the pixel threshold value.

13. The system of claim 9, wherein the pixel threshold value is at least one of selected by a user or selected automatically.

14. The system of claim 9, wherein the segmentation setting is at least one of selected by a user or selected automatically.

15. The system of claim 9, wherein the image analyzer is to output the identified potential abnormalities.

16. The system of claim 15, wherein outputting the identified potential abnormalities includes at least one of displaying the image with the identified potential abnormalities via a user interface, sending the identified potential abnormalities to a device associated with a healthcare system, or generating an alert related to the identified potential abnormalities.

17. A tangible computer readable medium storing instructions that, when executed, cause a computing device to at least:
   determine a pixel threshold value for an analysis of an image selected by a user, wherein the image includes a plurality of pixels;
   determine a segmentation setting for the analysis, the segmentation setting specifying a size of a portion of the image to be used during the analysis;
   analyze the image by determining a difference between a first segment of the image and a second segment of the image and comparing the difference to the pixel threshold value and the segmentation setting; and
   identify potential abnormalities in the image based on the analysis.

18. The computer readable medium of claim 17, wherein the pixel threshold value defines a pixel value of a normal image, the pixel value representing a brightness of the image.

19. The computer readable medium of claim 17, wherein analyzing the image comprises:
   selecting the first segment of the image based on the segmentation setting;
   selecting the second segment of the image based on the segmentation setting;
   computing a first average pixel value for the first segment;
   computing a second average pixel value for the second segment;
   determining a difference between the first average pixel value and the second average pixel value; and
   comparing the difference between the first average pixel value and the second average pixel value to the pixel threshold value.

20. The computer readable medium of claim 19, wherein a potential abnormality is identified when the difference between the first average pixel value and the second average pixel value exceeds the pixel threshold value.

21. The computer readable medium of claim 17, wherein the pixel threshold value is at least one of selected by a user or selected automatically.

22. The computer readable medium of claim 17, wherein the segmentation setting is at least one of selected by a user or selected automatically.

23. The computer readable medium of claim 17, further comprising instructions that cause the computing device to output the identified potential abnormalities.

24. The computer readable medium of claim 23, wherein outputting the identified potential abnormalities includes at least one of displaying the image with the identified potential abnormalities via a user interface, sending the identified potential abnormalities to a device associated with a healthcare system, or generating an alert related to the identified potential abnormalities.

\* \* \* \* \*